US011495931B2

(12) United States Patent
Bristol et al.

(10) Patent No.: US 11,495,931 B2
(45) Date of Patent: Nov. 8, 2022

(54) ROTATABLE CONNECTORS FOR MULTIMEDIA DEVICES

(71) Applicant: META PLATFORMS TECHNOLOGIES, LLC, Menlo Park, CA (US)

(72) Inventors: Peter Wesley Bristol, Seattle, WA (US); Oliver Ross, Seattle, WA (US); Bryan W Fan, San Francisco, CA (US); Enric Vial Roig, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/184,309

(22) Filed: Feb. 24, 2021

(65) Prior Publication Data

US 2022/0271485 A1     Aug. 25, 2022

(51) Int. Cl.
*H04R 1/02*     (2006.01)
*H01R 35/04*    (2006.01)
*H01R 13/639*   (2006.01)
*G06F 1/16*     (2006.01)

(52) U.S. Cl.
CPC .......... *H01R 35/04* (2013.01); *G06F 1/1605* (2013.01); *H01R 13/639* (2013.01); *H01R 2201/06* (2013.01); *H01R 2201/18* (2013.01)

(58) Field of Classification Search
CPC ...... H01R 35/04; H01R 13/639; G06F 1/1605
See application file for complete search history.

(56) References Cited

U.S. PATENT DOCUMENTS

| 3,297,886 | A | * | 1/1967 | Danner | H01R 25/006 439/654 |
| 4,719,314 | A | * | 1/1988 | Nothnagel | H02G 3/083 439/11 |
| 4,959,021 | A | * | 9/1990 | Byrne | H01R 35/02 439/211 |
| 5,144,290 | A | * | 9/1992 | Honda | G06F 1/1683 345/905 |
| 5,390,433 | A | * | 2/1995 | Brady | D06F 75/28 219/256 |
| 5,572,402 | A | * | 11/1996 | Jeong | G11B 33/124 |

(Continued)

FOREIGN PATENT DOCUMENTS

EP     2661581 A1     11/2013

OTHER PUBLICATIONS

International Search Report and Written Opinion for International Application No. PCT/US2022/017625, dated Jun. 3, 2022, 9 pages.

*Primary Examiner* — Neil Abrams
(74) *Attorney, Agent, or Firm* — FisherBroyles, LLP (57) ABSTRACT

The disclosed multimedia devices may include an elongated first body comprising a major longitudinal axis between a proximal end and a distal end, a second body comprising at least one electrical connector accessible from a surface of the second body, wherein the second body is configured to rotate about the major longitudinal axis of the elongated first body, and an electrical coupling configured to maintain an electrical connection between a circuit of the elongated first body and the at least one electrical connector when the second body is rotated. Various other devices, systems, and methods are also disclosed.

18 Claims, 9 Drawing Sheets

(56) References Cited

U.S. PATENT DOCUMENTS

| | | | | |
|---|---|---|---|---|
| 5,598,319 A * | 1/1997 | Lee | A63F 13/08 | 439/31 |
| 5,681,171 A * | 10/1997 | Park | H01R 35/02 | 439/31 |
| 5,901,035 A * | 5/1999 | Foster | G06F 1/1616 | 361/679.55 |
| 5,975,927 A * | 11/1999 | Giles | H01R 24/62 | 439/131 |
| 6,002,581 A * | 12/1999 | Lindsey | G06F 1/166 | 361/679.55 |
| 6,093,038 A * | 7/2000 | Chen | G06F 1/1616 | 439/31 |
| 6,113,409 A * | 9/2000 | Park | H01R 13/62933 | 439/945 |
| 6,137,685 A * | 10/2000 | Morinaga | G06F 1/1656 | 292/176 |
| 6,165,010 A * | 12/2000 | Prazoff | H01R 25/168 | 439/534 |
| 6,220,889 B1 * | 4/2001 | Ely | H01R 13/5841 | 439/446 |
| 6,273,735 B1 * | 8/2001 | Johnson | H01R 39/10 | 439/131 |
| 6,290,517 B1 * | 9/2001 | Anderson | G06F 1/1616 | 439/131 |
| 6,312,270 B1 * | 11/2001 | Hamon | H01R 35/04 | 439/131 |
| 6,637,949 B2 * | 10/2003 | Loch | G02B 6/4202 | 385/59 |
| 6,873,808 B2 * | 3/2005 | Ueda | G03G 15/80 | 439/131 |
| 6,897,379 B1 * | 5/2005 | Hsiao | H01R 35/04 | 174/53 |
| 6,980,422 B2 * | 12/2005 | Bhogal | G06F 1/181 | 361/679.55 |
| 7,083,421 B1 * | 8/2006 | Mori | H01R 25/006 | 439/574 |
| 7,364,443 B1 * | 4/2008 | McGinnis | H01R 35/02 | 439/534 |
| 7,393,212 B2 * | 7/2008 | Parker | H01R 12/716 | 439/8 |
| 7,469,053 B2 * | 12/2008 | Langberg | H04R 5/02 | 381/388 |
| 7,483,262 B2 * | 1/2009 | Yin | G06F 1/1616 | 361/679.01 |
| 7,510,420 B2 * | 3/2009 | Mori | G06F 13/409 | 439/8 |
| 7,540,748 B2 * | 6/2009 | Tracy | H01R 35/04 | 439/23 |
| 7,789,711 B2 * | 9/2010 | Wu | H01R 31/06 | 439/165 |
| 7,811,136 B1 | 10/2010 | Hsieh et al. | | |
| 7,887,332 B2 * | 2/2011 | Bauer | H01R 35/04 | 439/131 |
| 7,916,478 B2 * | 3/2011 | Tu | F16M 13/005 | 248/398 |
| 7,922,502 B1 * | 4/2011 | Chen | G06F 1/1675 | 439/131 |
| 7,959,449 B2 * | 6/2011 | Tracy | G06F 1/1616 | 439/131 |
| 8,323,040 B2 * | 12/2012 | Prest | H01R 13/44 | 439/165 |
| 8,348,684 B2 * | 1/2013 | Ladouceur | H04M 1/0274 | 439/131 |
| 8,644,018 B2 * | 2/2014 | Hung | G06F 1/1632 | 16/302 |
| 8,780,546 B2 * | 7/2014 | Zhou | H01R 27/00 | 361/679.41 |
| 8,897,005 B2 * | 11/2014 | Huang | G06F 1/1684 | 361/679.01 |
| 8,968,023 B1 * | 3/2015 | Walters | H02G 3/0481 | 439/446 |
| 8,986,022 B2 * | 3/2015 | Dinh | H01R 13/5213 | 439/131 |
| 9,197,839 B2 * | 11/2015 | Lin | G06F 1/181 | |
| 9,362,765 B1 * | 6/2016 | Blaszczak | H01R 31/065 | |
| 9,891,666 B2 * | 2/2018 | Buss | H01R 13/6315 | |
| 9,929,588 B2 * | 3/2018 | Ireland | A47L 9/2873 | |
| 10,540,313 B2 * | 1/2020 | Huang | G06F 13/4068 | |
| 10,784,618 B2 * | 9/2020 | Wang | H04M 1/04 | |
| 11,216,026 B2 * | 1/2022 | Aksoy | G06F 1/1601 | |
| 2005/0282417 A1 * | 12/2005 | Tsao | H01R 25/003 | 439/131 |
| 2006/0081707 A1 * | 4/2006 | Yang | G06F 1/1601 | 235/441 |
| 2006/0085584 A1 * | 4/2006 | Chen | G06F 3/038 | 710/303 |
| 2006/0250767 A1 * | 11/2006 | Brophy | G06F 1/1632 | 361/679.45 |
| 2008/0103637 A1 * | 5/2008 | Bliven | F16B 2/20 | 701/1 |
| 2009/0273705 A1 * | 11/2009 | Matsumoto | H04N 21/436 | 348/383 |
| 2010/0069117 A1 * | 3/2010 | Knighton | H04M 1/0274 | 455/566 |
| 2011/0243548 A1 | 10/2011 | Khamsepoor et al. | | |
| 2012/0063079 A1 * | 3/2012 | Yeh | G06F 1/1681 | 361/679.4 |
| 2012/0188691 A1 * | 7/2012 | Zhou | F16M 11/10 | 361/679.01 |
| 2017/0208697 A1 * | 7/2017 | Kurian | H02J 7/0044 | |

\* cited by examiner

ROTATABLE CONNECTORS FOR MULTIMEDIA DEVICES

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A multimedia device (e.g., an interactive multimedia device) may be attached to and/or mounted on an electronic device. The multimedia device may also be communicatively coupled to the electronic device in order for the combination of the multimedia device and the electronic device to increase functionality and enhance a multimedia experience for a user. The multimedia device may use cables for power transmission and/or data communications. Due to the various physical sizes and mounting constraints (e.g., the bending radius of cables attached to the multimedia device) that are associated with the electronic device, the orientation and/or location of the cable connectors of the multimedia device may limit mounting options for the multimedia device on the electronic device. For example, if the multimedia device is mounted on a top edge surface of a wall-mounted flat screen television, the distance between the rear edge of the television and the wall on which the television is mounted may be inadequate to accommodate cables extending horizontally outward from the multimedia device towards the wall. As another example, if the multimedia device is mounted on a horizontal surface (e.g., a table), cables that extend downward from the multimedia device may prevent the multimedia device from lying flat on the horizontal surface.

The present disclosure, in contrast, is directed to new and improved devices, systems, and methods for accommodating cables connected to a multimedia device to allow for the multimedia device to be conveniently mounted on multiple devices and/or surfaces. For example, the multimedia device may include first and second enclosures (e.g., a body, a housing, etc.). The first enclosure may be configured as an elongated body for mounting on the electronic device and/or on a horizontal surface. The second enclosure may include a body that includes connectors for the cables and that is rotatable relative to the first enclosure. The rotatable body may be configured to rotate about a longitudinal axis of the elongated body while maintaining an electrical connection between a circuit of the elongated body and the connector/cable. Configuring the rotatable body to rotate within the elongated body may allow the orientation of the cables to accommodate the physical configuration of the electronic device/surface on which the multimedia device is mounted.

In some embodiments, the multimedia device (e.g., an interactive multimedia device which may be used for video calls and/or other interactive activities) may include a camera, a microphone, one or more speakers, a supporting bracket that allows the device to be mounted on the electronic device (e.g., a television, a laptop, a computer monitor, a display, etc.) or placed on a surface (e.g., a table), or any combination thereof. In some embodiments, the multimedia device may also include one or more buttons for operation, an indicator light visible to a user, a physical camera shutter, and horizontally extending louvers that obscure various components, such as the speakers. As will be explained in greater detail below, embodiments of the present disclosure may improve the usability of the multimedia device by providing users with convenient and flexible mounting options for the multimedia device.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-4, detailed descriptions of devices, systems, and methods for mounting a multimedia device to an electronic device. In addition, the following will provide, with reference to FIGS. 5-6, detailed descriptions of a support bracket for mounting a multimedia device to an electronic device. A description of mounting a multimedia device to a horizontal surface will be provided with reference to FIG. 7. A description of a cross-sectional view of a multimedia device will be provided with reference to FIG. 8. A description of an example method of manufacturing a multimedia device with a rotatable body will be provided with reference to FIG. 9.

Figure 1:
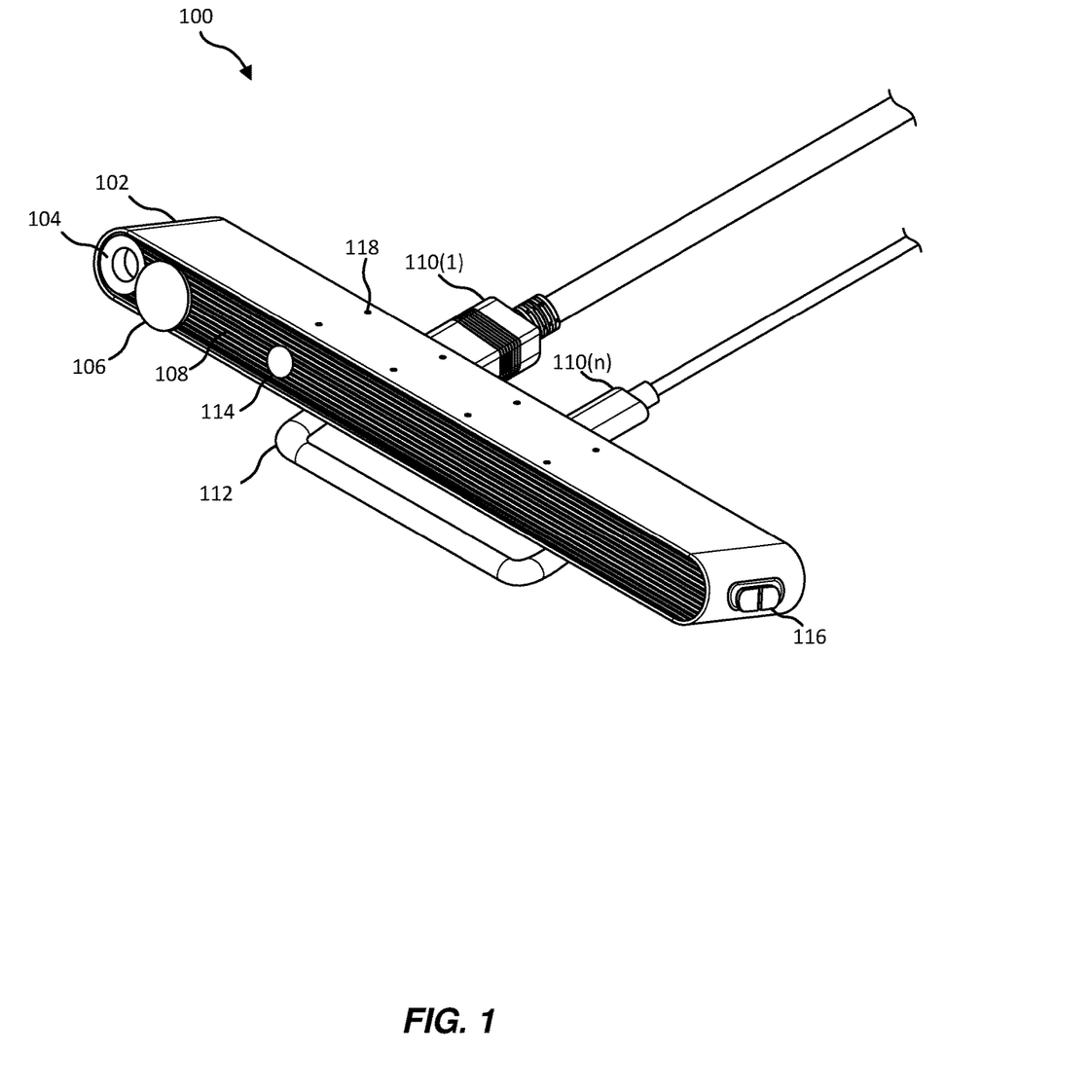
FIG. 1 is a front perspective view of an example multimedia device, according to at least one embodiment of the present disclosure.

FIG. 1 is a front perspective view of an example multimedia device 100, according to at least one embodiment of the present disclosure. In some examples, multimedia device 100 may include an enclosure 102 (e.g., an elongated body, a housing, etc.), a camera 104 (e.g., an image sensor), a camera lens shutter 106, louvers 108, a rear support bracket 112, a speaker 114, a button 116, and at least one microphone 118. The multimedia device 100 may be configured for connection to one or more cables 110(1) . . . (110(n) (e.g., a Universal Serial Bus (USB) cable, a High Definition Multimedia Interface (HDMI) cable, a Display Port cable, a power cable, an ethernet cable, etc.).

Multimedia device 100 may include camera 104 and/or microphone 118 configured to facilitate videoconferencing and/or other interactive multimedia functions. Multimedia device 100 may include camera lens shutter 106 configured to transition between an open position to expose camera 104 to the ambient environment and a closed position to prevent camera 104 from acquiring images. In some embodiments, microphone 118 may be positioned and configured to receive audio for conferencing and/or receive audio commands. Speaker 114 may be positioned and configured to transmit audio to the ambient environment for conferencing and/or responding to audio commands. Multimedia device 100 may include at least one louver 108 that covers at least a portion of a front region of multimedia device 100. In some examples, louvers 108 may cover speaker 114. In some embodiments, multimedia device 100 may include at least one button 116 configured to trigger a change in status of multimedia device 100 in response to receiving user input. For example, button 116 may turn multimedia device 100 on and/or off when pressed, adjust a volume of sound emitted from speaker 114, adjust a field of view of camera 104, etc.

In some embodiments, the term "multimedia device" may refer to a device capable of receiving, recording, generating, producing, storing, transmitting, and/or emitting video and/or audio data. In some examples, a multimedia device may facilitate voice calls and/or video conferencing by recording, transmitting, or otherwise streaming video and/or audio data from the multimedia device and/or an additional device (e.g., an electronic device such as a television). In some embodiments, a multimedia device may perform additional functions, such as interfacing with one or more web sites, web applications, and/or other applications. For example, a multimedia device may retrieve, store, and/or transmit still images for display on the electronic device (e.g., an external display such as a television).

In some embodiments, the term "electronic device" may refer to any device with one or more display elements (e.g., display screens) that is capable of being connected to a multimedia device. In some embodiments, an electronic device may lack computing components such as a central processing unit, hard drive, and/or memory. In other embodiments, an electronic device may include such computing components. Examples of electronic devices may include, without limitation, televisions (e.g., both "smart" and "dumb" televisions), computer monitors, tablets, laptops, etc.

Multimedia device 100 may include at least one connector (not shown in FIG. 1) disposed on a surface (e.g., a rear surface) of a rotatable body located at the rear portion of multimedia device 100. Cables 110(1) . . . 110(n) may be connected to multimedia device 100 via the connectors. As will be described below with reference to FIGS. 2-9, cables 110(1) . . . 110(n) may be configured to rotate about a longitudinal axis of multimedia device 100 while maintaining an electrical connection between a circuit of multimedia device 100 and cables 110(1) . . . 110(n). Configuring cables 110(1) . . . 110(n) to rotate relative to multimedia device 100 may allow the orientation of cables 110(1) . . . 110(n) to accommodate the physical configuration of the electronic device, or other surface or device, on which the multimedia device 100 is mounted.

In some examples, rear support bracket 112 may be connected pivotally to a rear surface of multimedia device 100. Rear support bracket 112 may pivot about a longitudinal axis of multimedia device 100. For example, rear support bracket 112 may pivot about the same longitudinal axis of multimedia device 100 about which the rotatable body located at the rear portion of multimedia device 100 is rotatable. As will be described in detail below with reference to FIGS. 3-4, rear support bracket 112 may be configured to secure multimedia device 100 to a top edge of an electronic device (e.g., a television, a laptop, a computer monitor, etc.). In some examples, a gravitational force acting upon a cables 110(1) . . . 110(n) connected to rear connectors of multimedia device 100 may increase a frictional force between rear support bracket 112 and the electronic device, thereby increasing the physical security of multimedia device 100 mounted to the top edge of the electronic device.

Figure 2:
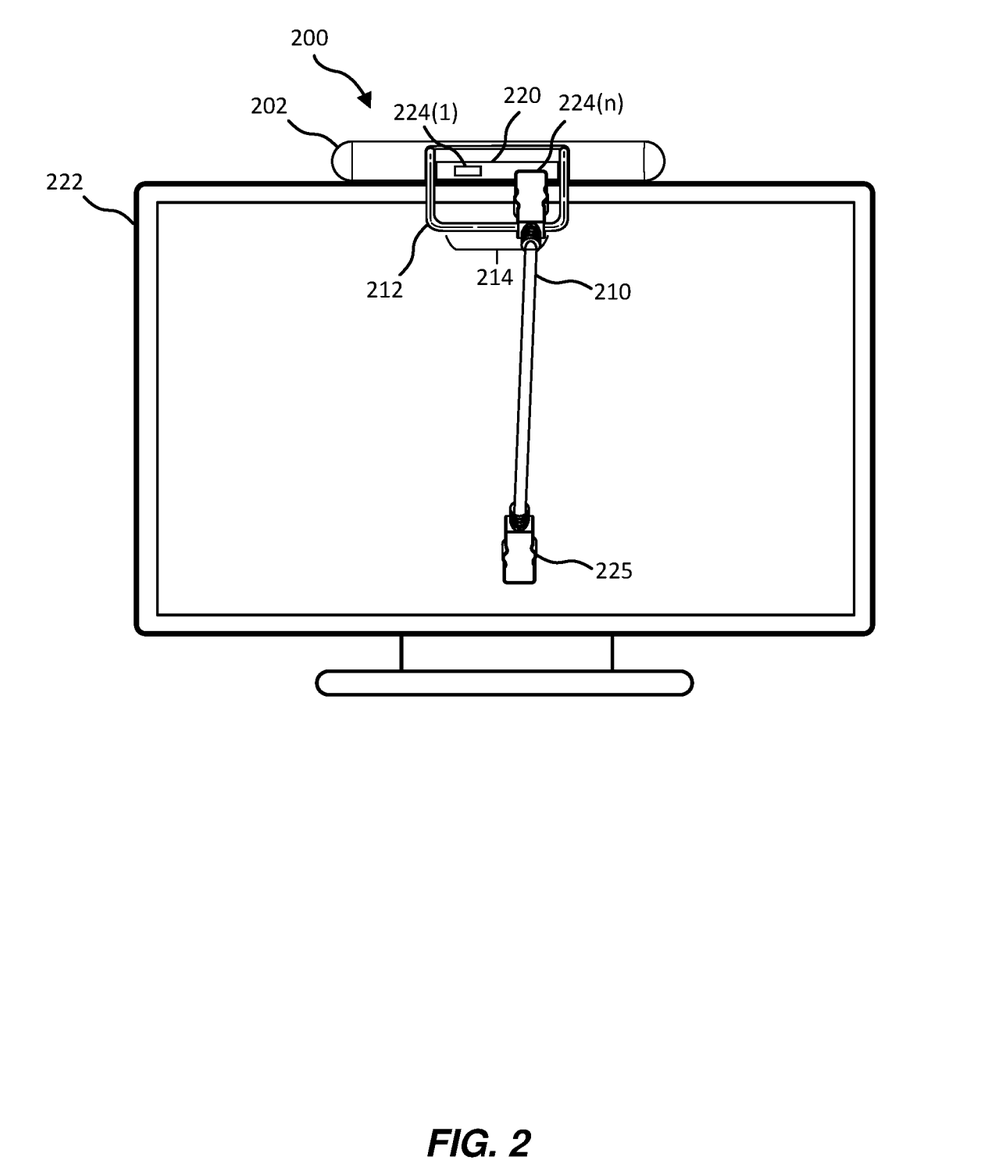
FIG. 2 is a rear view of an example multimedia device mounted on an electronic device, according to at least one embodiment of the present disclosure.

FIG. 2 is a rear view of an example multimedia device 200 mounted on an electronic device 222, according to at least one embodiment of the present disclosure. FIG. 2 shows multimedia device 200 secured to the top edge of electronic device 222 by rear support bracket 212. Rear support bracket 212 may pivot about a longitudinal axis of multimedia device 200 such that a lower region 214 of rear support bracket 212 presses against electronic device 222 (e.g., against a rear surface of electronic device 222) in order to secure multimedia device 200 to electronic device 222. In some embodiments, rear support bracket 212 may be biased toward a forward position, such as by a spring, such that rear support bracket 212 applies a force against electronic device 222 when multimedia device 200 is mounted on electronic device 222 as shown in FIG. 2.

Multimedia device 200 may include an elongated body 202 and a rotatable body 220 that may be rotatable relative to elongated body 202. Rotatable body 220 may include one or more connectors 224(1) . . . 224(n) (e.g., a USB connector, an HDMI connector, a Display Port connector, a power connector, an ethernet connector, etc.) that may be accessible on the surface of rotatable body 220. Connectors 224(1) . . . 224(n) may be accessible to a user to insert cable 210 (e.g., a power cable, a data communication cable). When cable 210 is inserted into connectors 224(1) . . . 224(n), a gravitational force acting upon cable 210 may cause rotatable body 220 to rotate about the major longitudinal axis of elongated body 202.

The weight of cable 210 may cause rotatable body 220 to rotate such that cable 210 lies in a downward position along the rear of electronic device 222. Cable 210 may include a second connector 225 disposed on an opposite end of cable 210 from connector 224(n). Connector 225 may be plugged into a communication port (e.g., an HDMI communication port) on electronic device 222 to allow data (e.g., multimedia data, video data, audio data, etc.) to be transferred between electronic device 222 and multimedia device 200 in order to support services such as video conferencing.

In some examples, the gravitational force acting upon cable 210 connected to connector 224(n) may increase a frictional force between multimedia device 200 (e.g., rear support bracket 212, elongated body 202, etc.) and electronic device 222. When multimedia device 200 is mounted on electronic device 222, the frictional force may be applied between lower region 214 of rear support bracket 212 and the rear surface of electronic device 222. In some examples, lower region 214 of rear support bracket 212 may include a friction material (e.g., a rubber sleeve) exhibiting a high static coefficient of friction and configured to further increase the frictional force.

Figure 3:
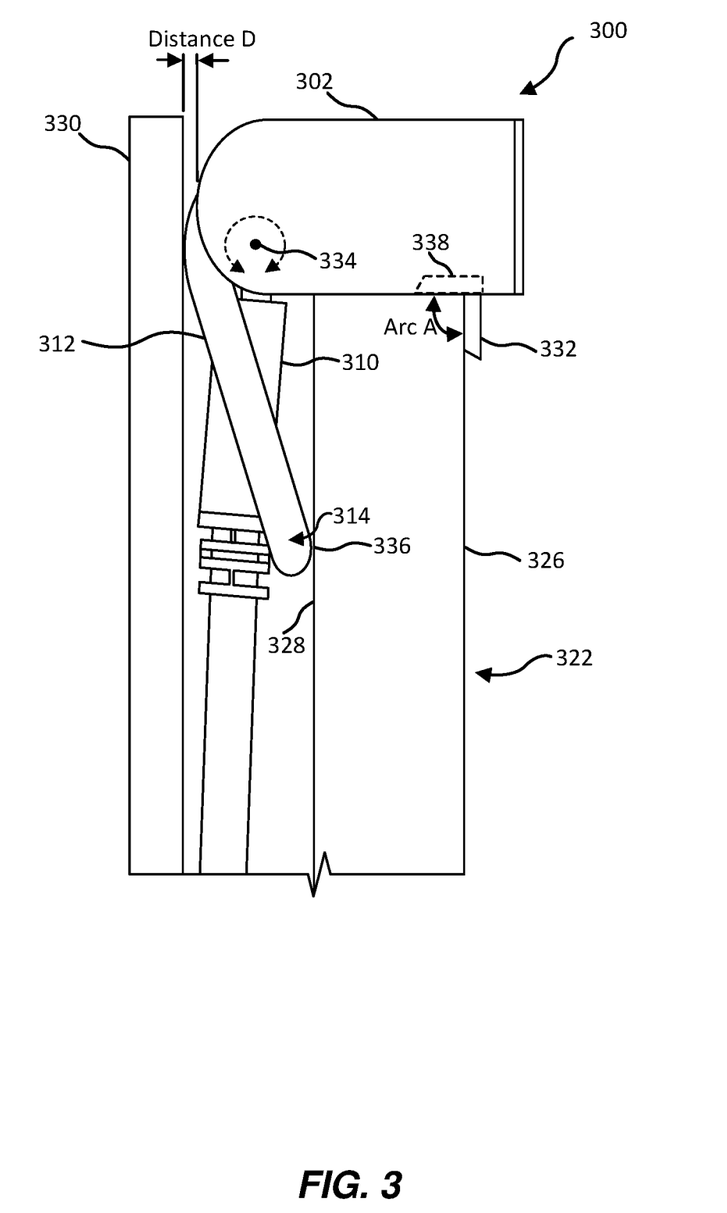
FIG. 3 is a side view of an example multimedia device mounted on an electronic device, according to at least one embodiment of the present disclosure.

FIG. 3 is a side view of an example multimedia device 300 mounted on an electronic device 322, according to at least one embodiment of the present disclosure. In some examples, electronic device 322 (e.g., a flat screen television, a teleconferencing display, a computer display, etc.) may be mounted adjacent to a wall 330 or another surface or object. Multimedia device 300 may include enclosure 302 configured and shaped as an elongated body. Multimedia device 300 may include a rotatable body (e.g., an enclosure, a housing, etc.) that is configured to rotate about a longitudinal axis 334 of enclosure 302.

When cable 310 is connected to an electrical connector accessible on a surface of the rotatable body, a gravitational force may act upon cable 310 causing the rotatable body to rotate about longitudinal axis 334 such that cable 310 extends downward (e.g., substantially parallel to wall 330). By configuring the rotatable body to rotate about longitudinal axis 334 and cable 310 to lie substantially parallel to wall 330, a distance D between multimedia device 200 and wall 330 may be decreased as compared to multimedia devices mounted on electronic devices that include a connector that would cause cable 310 to extend generally horizontally from the multimedia device.

In some examples, multimedia device 300 may be mounted on electronic device 322 such that multimedia device 300 may be secured to the top edge of electronic device 322 by rear support bracket 312. Rear support bracket 312 may pivot about longitudinal axis 334 of multimedia device 300 such that a lower region 314 of rear support bracket 312 presses against electronic device 322 in contact area 336 in order to secure multimedia device 300 to electronic device 322.

In some examples, the gravitational force acting upon cable 310 connected to multimedia device 300 may increase a frictional force between support bracket 312 and electronic device 322. The frictional force may be applied at a location between lower region 314 of rear support bracket 312 and a rear surface 328 of electronic device 322 at contact area 336. In some examples, lower region 314 of rear support bracket 312 may include a friction material configured to further increase the frictional force at contact area 336.

In some examples, multimedia device 300 may include a front support bracket 332 connected to a front surface 326 and/or a bottom surface of multimedia device 300. Front support bracket 332 may be configured to pivot through arc A to allow front support bracket 332 to rotate into a recessed area 338 of enclosure 302. Front support bracket 332 may also be configured to pivot through arc A to a position substantially parallel to front surface 326 of electronic device 322. Multimedia device 300 may be mounted on electronic device 322 such that front support bracket 332 is in contact with an upper portion of front surface 326 as shown in FIG. 3. Front support bracket 332 may be configured to secure multimedia device 300 to front surface 326 while rear support bracket 312 may be configured to secure multimedia device 300 to rear surface 328. In some embodiments, front support bracket 332 may be biased to a closed position, such as by a spring.

Figure 4:
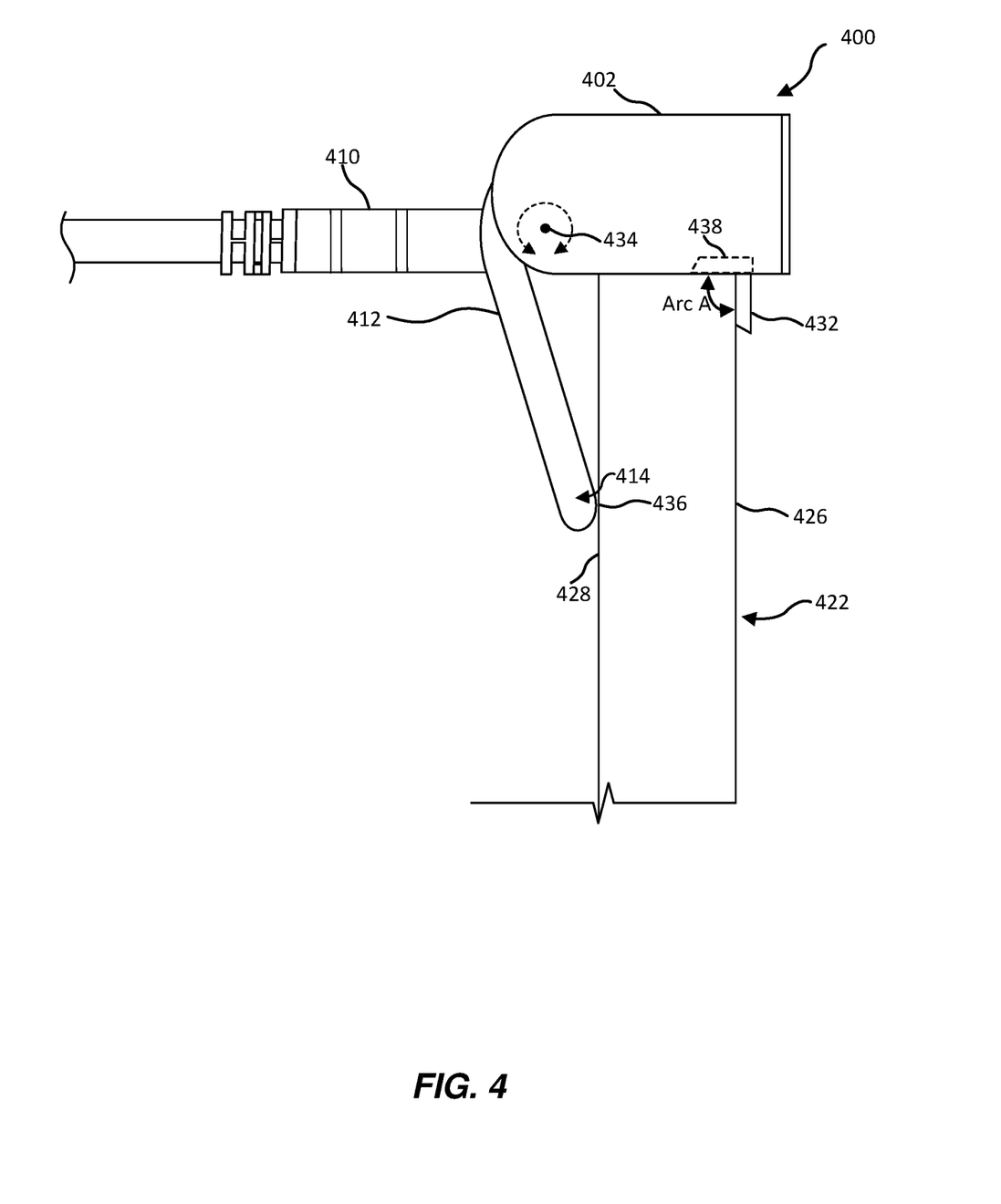
FIG. 4 is a side view of an example multimedia device mounted on an electronic device with an attached cable extending in a horizontal direction, according to at least one embodiment of the present disclosure.

FIG. 4 is a side view of an example multimedia device 400 mounted on an electronic device 422 with an attached cable 410 extending in a horizontal direction, according to at least one embodiment of the present disclosure. FIG. 4 shows a similar mounting configuration to FIG. 3. For example, multimedia device 400 may include an elongated body 402 and a rotatable body that is configured to rotate about a longitudinal axis 434 of multimedia device 400.

Multimedia device 400 may be secured to the top edge of electronic device 422 by rear support bracket 412. Rear support bracket 412 may pivot about longitudinal axis 434 of elongated body 402 such that a lower region 414 of rear support bracket 412 presses against a contact area 436 of electronic device 422 in order to secure multimedia device 400 to electronic device 422. A frictional force may secure lower region 414 of rear support bracket 412 to a rear surface 428 of electronic device 422 in contact area 436. Multimedia device 400 may also include a front support bracket 432 connected to a front surface and/or a bottom surface of multimedia device 400. Front support bracket 432 may be configured to pivot through arc A to allow front support bracket 432 to rotate into recessed area 438 and a position substantially parallel to front surface 426 of electronic device 422.

In the example shown in FIG. 4, electronic device 422 may be a free-standing device (e.g., not mounted on a wall) and cable 410 may extend out horizontally to the left as shown in FIG. 4. In some examples, the rotatable body configured to rotate in elongated body 402 may allow cable 410 to rotate about longitudinal axis 434 by up to at least ninety degrees (e.g., from a vertical position to a horizontal position). The ability of cable 410 to rotate by up to at least ninety degrees allows increased mounting configurations for multimedia device 400 as compared to multimedia devices without rotatable connector bodies.

Figure 5:
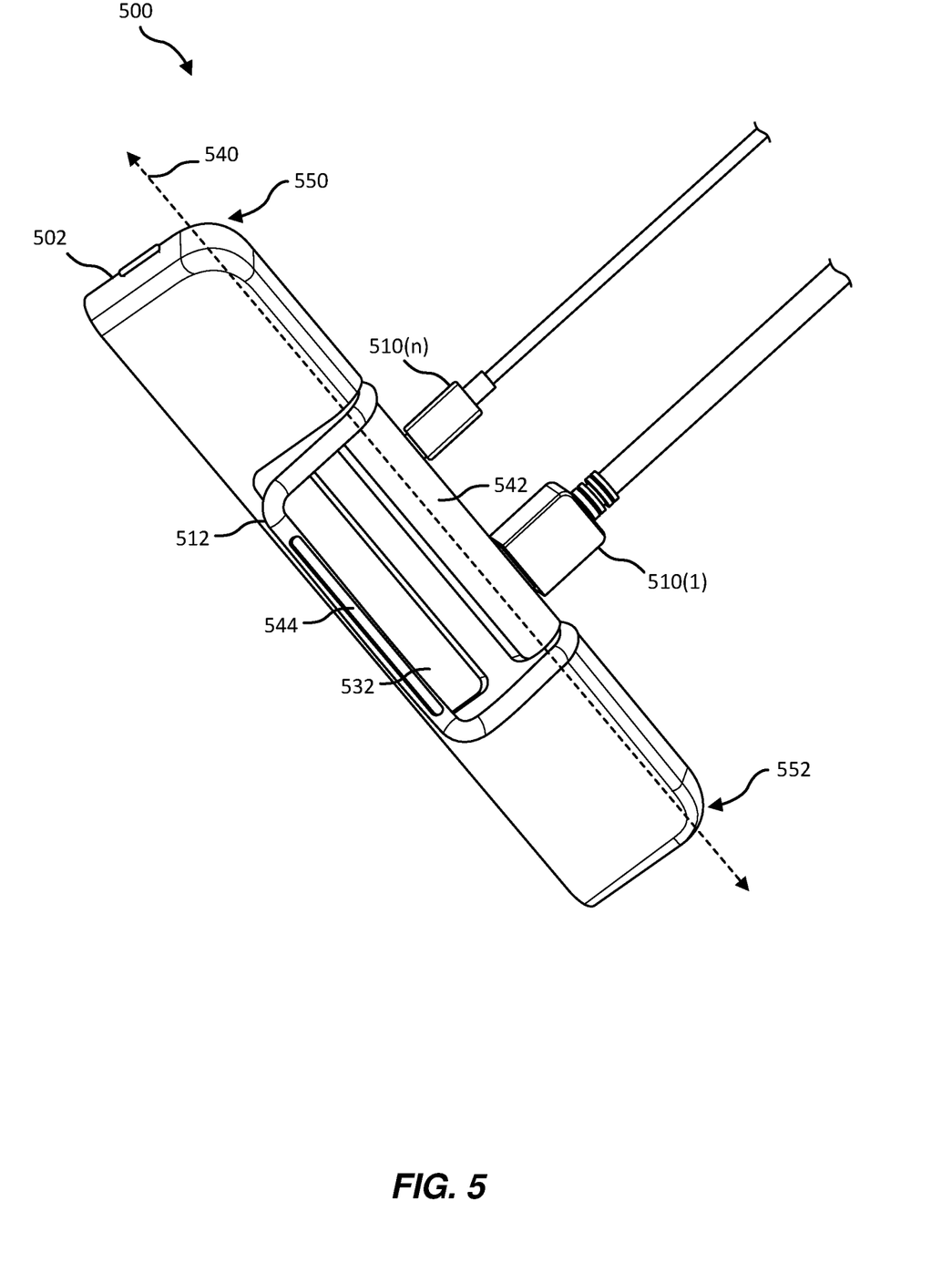
FIG. 5 is a bottom perspective view of an example multimedia device, according to at least one embodiment of the present disclosure.

FIG. 5 is a bottom perspective view of an example multimedia device 500, according to at least one embodiment of the present disclosure. In some examples, multimedia device 500 may include an enclosure 502 (e.g., an elongated body, a housing, etc.), a rear support bracket 512, a front support bracket 532, and a friction material 544 on rear support bracket 512. Multimedia device 500 may include a major longitudinal axis 540 located between a proximal end 550 and a distal end 552.

Multimedia device 500 may include at least one connector (not visible from the perspective of FIG. 5) disposed on a surface of a rotatable body 542 located at the rear portion of multimedia device 500. Cables 510(1) . . . 510(n) may be connected to multimedia device 500 via the connectors. Cables 510(1) . . . 510(n) may be configured to rotate about major longitudinal axis 540 while maintaining an electrical connection between a circuit of multimedia device 500 and cables 510(1) . . . 510(n). Configuring cables 510(1) . . . 510(n) to rotate relative to enclosure 502 may allow the orientation of cables 510(1) . . . 510(n) to accommodate the physical configuration of an electronic device, structure, or surface on which multimedia device 500 may be mounted. In some examples, rotatable body 542 may rotate through an angle of at least 45 degrees, at least 90 degrees, at least 135 degrees, at least 180 degrees, or more.

In some examples, rear support bracket 512 may be pivotally connected to a rear surface of multimedia device 500. Rear support bracket 512 may be configured to pivot about major longitudinal axis 540. in other words, rear support bracket 512 may be configured to pivot about the same longitudinal axis 540 of multimedia device 500 as rotatable body 542. Rear support bracket 512 may be configured to physically secure multimedia device 500 to a top edge of an electronic device (e.g., a television, a laptop, or a computer monitor), a structure (e.g., a camera support, a picture frame, etc.), or a surface (e.g., a tabletop, a countertop, a floor, etc.). In some examples, a gravitational force acting upon cables 510(1) . . . 510(n) connected to rear connectors of multimedia device 500 may increase a frictional force between rear support bracket 512 and the electronic device or other mounting structure, thereby increasing the physical security of multimedia device 500 mounted to the top edge of the electronic device or other mounting structure. Rear support bracket 512 may include a friction material 544 configured to further increase the frictional force.

Figure 6:
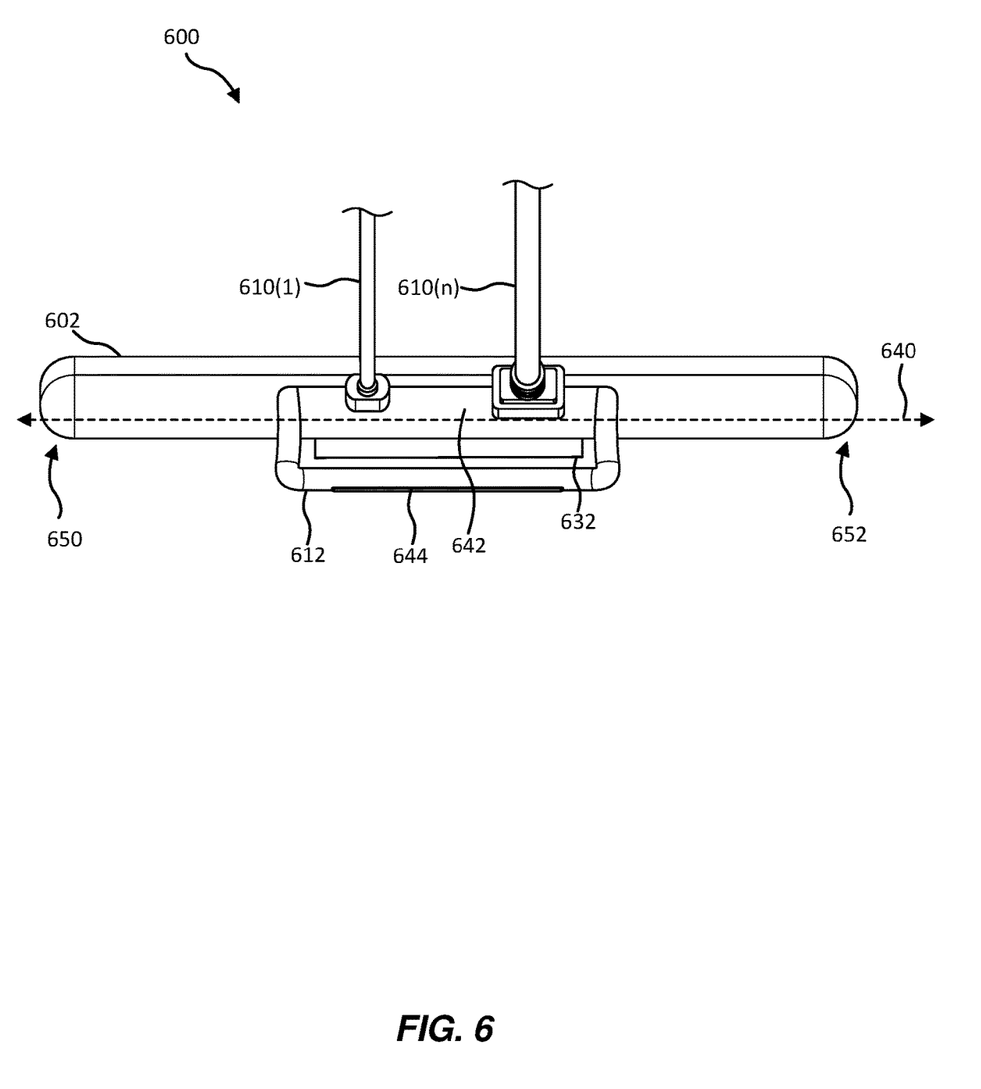
FIG. 6 is a rear view of an example multimedia device, according to at least one embodiment of the present disclosure.

FIG. 6 is a rear view of an example multimedia device 600, according to at least one embodiment of the present disclosure. FIG. 6 shows a rear view of the multimedia device described above with reference to FIGS. 1-5. Multimedia device 600 may include a major longitudinal axis 640 between a proximal end 650 and a distal end 652. Multimedia device 600 may include a rotatable body 642 that rotates about longitudinal axis 640. Rotatable body 642 may rotate about longitudinal axis 640 within an enclosure 602 (e.g., an elongated body, a housing, etc.). When multimedia device 600 is mounted on a surface (e.g., a horizontal surface, a top edge of a flat screen television, a table, a computer display, etc.), cables 610(1) . . . 610(*n*) may be configured to rotate about longitudinal axis 640 of multimedia device 600 while maintaining an electrical connection between a circuit of multimedia device 600 and cables 610(1) . . . 610(*n*). Although cables 610(1) . . . 610(*n*) are shown extending upwards in FIG. 6 in order to show details of the lower rear portion of multimedia device 600, cables 610(1) . . . 610(*n*) may extend downward or horizontally when mounted on an electronic device, such as due to the force of gravity or to direct cables 610(1) . . . 610(*n*) according to available space behind electronic device.

In some examples, a rear support bracket 612 may be configured pivot about longitudinal axis 640. Rear support bracket 612 may be configured to secure multimedia device 600 to a top edge of an electronic device or other mounting structure. A gravitational force acting upon cables 610(1) . . . 610(*n*) connected to rear connectors of multimedia device 600 may increase a frictional force to be applied between rear support bracket 612 and the electronic device, thereby increasing the physical security of multimedia device 600 mounted to the top edge of the electronic device. Rear support bracket 612 may include a friction material 644 configured to further increase the frictional force. In some examples, multimedia device 600 may include a front support bracket 632 connected to a front surface and/or a bottom surface of multimedia device 600. Front support bracket 632 may be configured to pivot from a recessed position in enclosure 602 to a position substantially parallel to a front surface of multimedia device 600.

Figure 7:
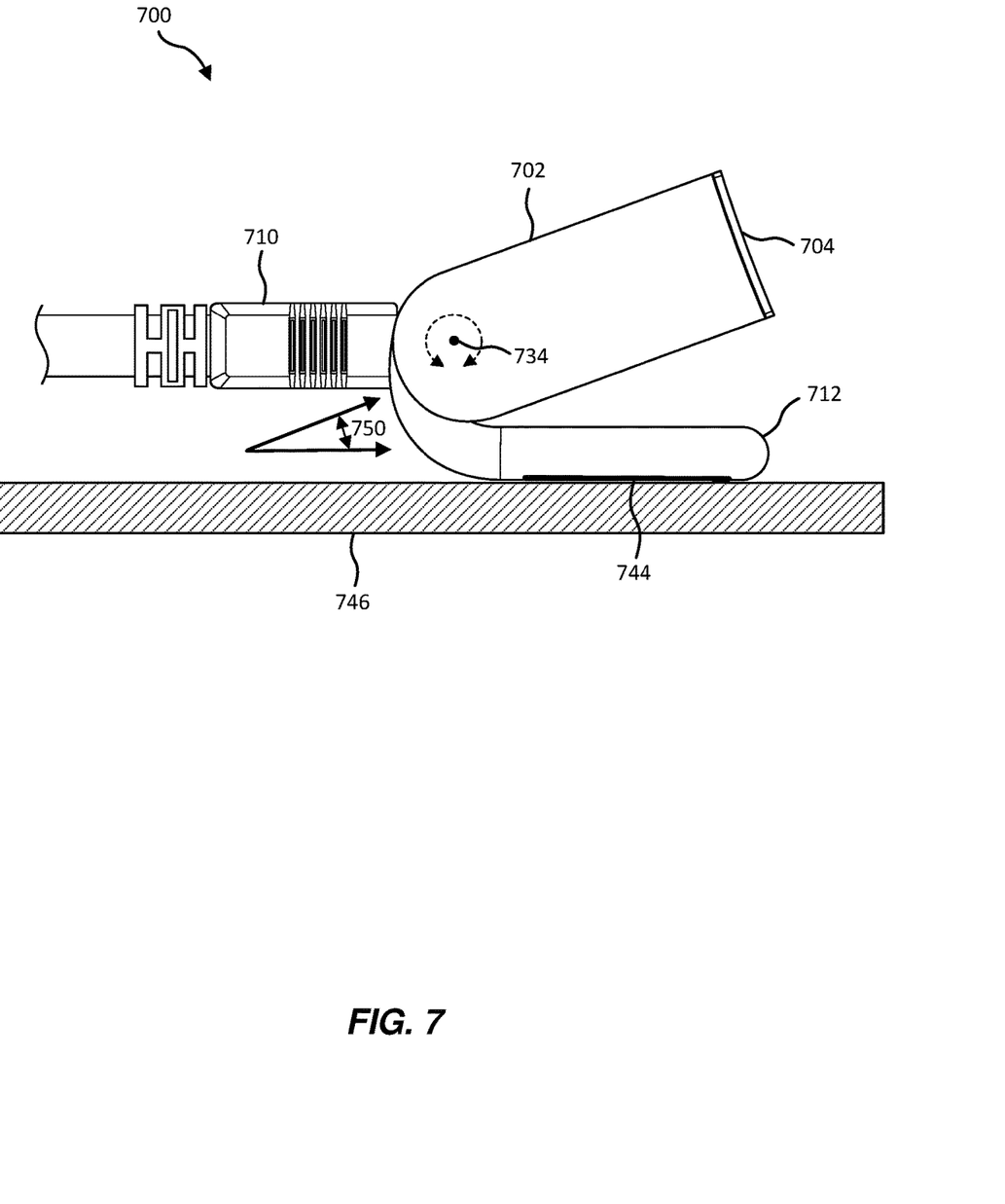
FIG. 7 is a side view of an example multimedia device disposed on a horizontal surface, according to at least one embodiment of the present disclosure.

Multimedia devices according to the present disclosure may be configured to be mounted and supported in a variety of configurations, such as on an electronic device or other mounting structure or on a horizontal surface. FIG. 7 is a side view of an example multimedia device 700 disposed on a horizontal surface 746, according to at least one embodiment of the present disclosure. In some examples, multimedia device 700 may be configured to lie on horizontal surface 746 (e.g., a coffee table, a nightstand, a television stand, a tabletop, a countertop, a floor, etc.) such that when cable 710 is connected to an electrical connector accessible on a surface of a rotatable body of multimedia device 700, cable 710 extends from the rotatable body substantially parallel to horizontal surface 746. The rotatable body may be configured to rotate relative to an enclosure (e.g., an elongated body, a housing) of multimedia device 700. For example, rotatable body may be rotatable about a longitudinal axis 734 through a range of angles relative to enclosure 702 to allow cable 710 to also rotate through the range of angles. In some examples, the rotatable body may be capable of rotating relative to enclosure 702 through an angle of at least 45 degrees, at least 90 degrees, at least 135 degrees, at least 180 degrees, or more.

In some examples, multimedia device 700 may include support bracket 712. Support bracket 712 may be configured to lie on horizontal surface 746 to support multimedia device 700. Enclosure 702 may be configured to pivot about longitudinal axis 734 such that enclosure 702 may be adjusted to an angle 750 relative to horizontal surface 746. Angle 750 may be adjusted by a user rotating enclosure 702 to an angle convenient for the user. For example, angle 750 may be adjusted by the user to change a field of view of a camera 704. An interface between support bracket 712 and enclosure 702 may include a material (e.g., a frictional material) or mechanism (e.g., a ratcheting mechanism, a detent mechanism, etc.) to hold support bracket 712 at a desired angle relative to enclosure 702. In some examples, a lower region of support bracket 712 may include a friction material 744 that is configured to inhibit multimedia device 700 from sliding on horizontal surface 746.

Figure 8:
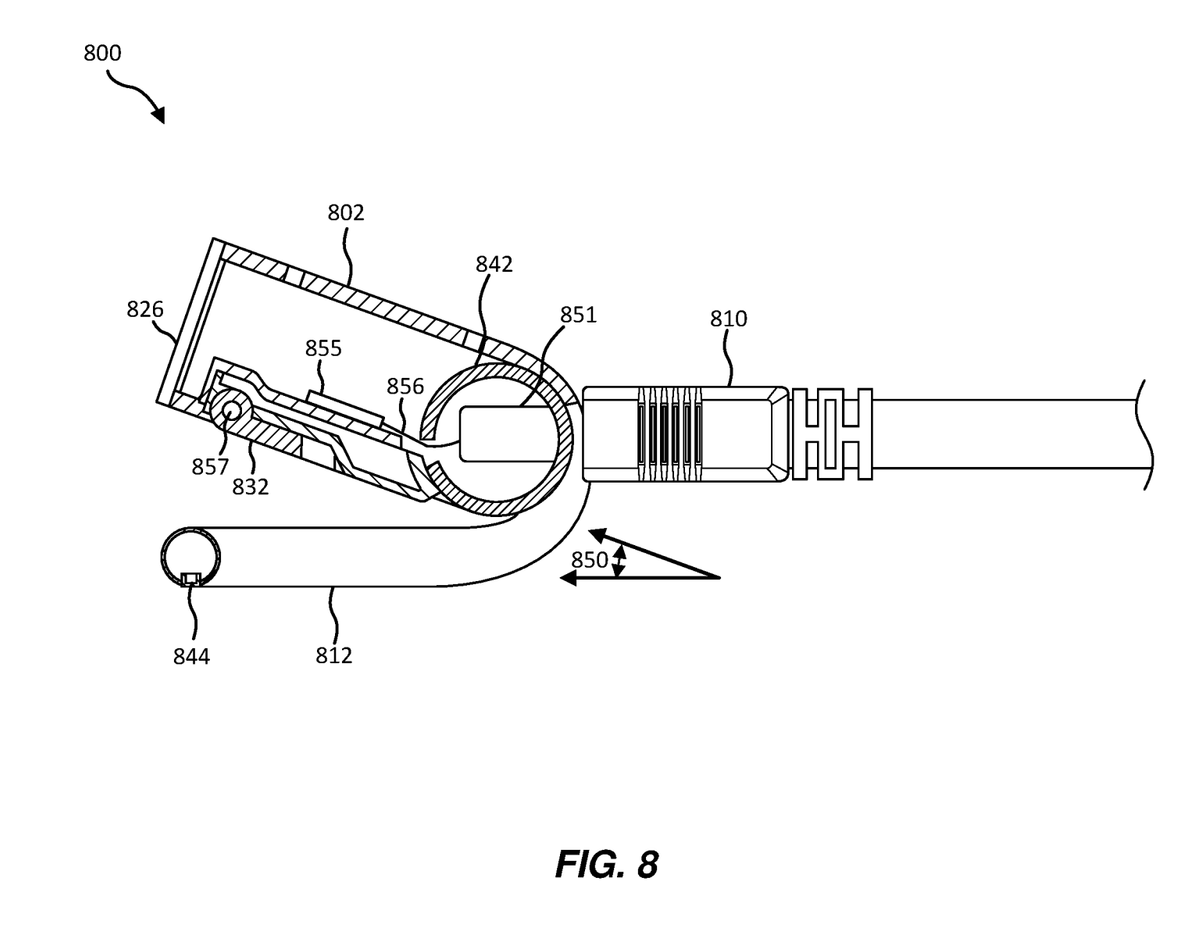
FIG. 8 is a side cross-sectional view of an example multimedia device, according to at least one embodiment of the present disclosure.

FIG. 8 is a side cross-sectional view of an example multimedia device 800, according to at least one embodiment of the present disclosure. FIG. 8 shows multimedia device 800 oriented with enclosure 802 raised at an angle 850 relative to a support bracket 812. Cable 810 may be connected to an electrical connector 851 accessible on a surface of rotatable body 842 of multimedia device 800. Cable 810 may be configured to extend from rotatable body 842 at the rear of multimedia device 800. Rotatable body 842 may rotate within enclosure 802. Rotatable body 842 may be configured to rotate within enclosure 802 through a range of angles. In some examples, rotatable body 842 may be configured to rotate through an angle of at least 45 degrees, at least 90 degrees, at least 135 degrees, at least 180 degrees, or more.

In some examples, rotatable body 842 may be configured to rotate about a longitudinal axis of enclosure 802 while maintaining an electrical connection between a circuit 855 disposed in enclosure 802 and connector 851 configured for connecting to cable 810. Configuring rotatable body 842 to rotate within enclosure 802 while maintaining an electrical connection between circuit 855 and connector 851 may allow the orientation of cable 810 to accommodate the physical configuration and/or restraints of the electronic device/surface on which multimedia device 800 is mounted. The electrical connection between circuit 855 and connector 851 may be maintained by conduit 856. Conduit 856 may include a flexible cable that moves to accommodate the rotation of connector 851. As shown in FIG. 8, conduit 856 may pass through a hole or slot in rotatable body 842 and may include sufficient slack to accommodate different angles of rotatable body 842 relative to enclosure 802.

In some examples, multimedia device 800 may include a front support bracket 832 disposed in a bottom region of enclosure 802. Front support bracket 832 may be configured to pivot about axis 857 to allow front support bracket 832 to rotate into, and out of, a recessed area on the bottom of enclosure 802. Front support bracket 832 may be configured to pivot to a position substantially parallel to front surface 826 of enclosure 802. Multimedia device 800 may be mounted on an electronic device such that front support bracket 832 is in contact with the top of the front surface of the electronic device as shown in FIG. 3.

In some examples, multimedia device 800 may also include support bracket 812. Support bracket 812 may be configured to allow multimedia device 800 to rest on a horizontal surface and/or to mount on an electronic device or other support structure as shown in FIGS. 2-4. Enclosure 802 may be configured to pivot about rotational body 842 such that enclosure 802 may be adjusted to angle 850, such as may be desired by a user. A lower region of support bracket 812 may include anti-slip material 844 configured to inhibit multimedia device 800 from sliding when resting on a horizontal surface.

Figure 9:
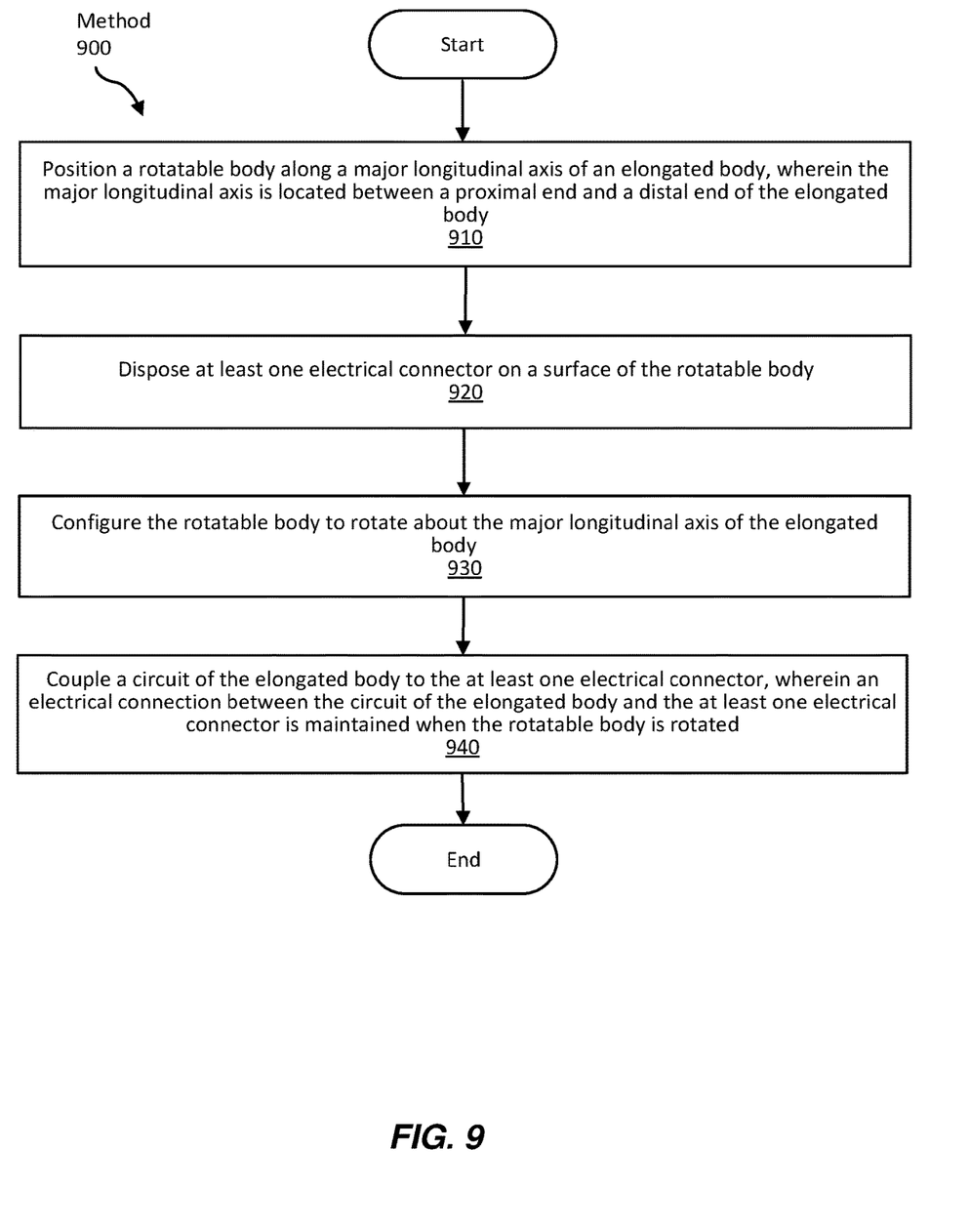
FIG. 9 is a flow diagram illustrating an example method of manufacturing a multimedia device with a rotatable body, according to at least one embodiment of the present disclosure.

FIG. 9 is a flow diagram illustrating an example method 900 of manufacturing a multimedia device with a rotatable body. At operation 910, method 900 may include positioning a rotatable body along a major longitudinal axis of an elongated body, wherein the major longitudinal axis is located between a proximal end and a distal end of the elongated body. Operation 910 may be performed in a variety of ways, as will be understood by one skilled in the art considering the present disclosure. For example, a rotatable body may be rotatably positioned along a major longitudinal axis of an elongated body as described above with reference to FIGS. 5 and 6.

At operation 920, method 900 may include disposing at least one electrical connector on a surface of the rotatable body. Operation 920 may be performed in a variety of ways, as will be understood by one skilled in the art considering the present disclosure. For example, at least one electrical connector may be disposed to be accessible from a surface of the rotatable body as described above with reference to FIGS. 1-8.

At operation 930, the rotatable body may be configured to rotate about the major longitudinal axis of the elongated body. Operation 930 may be performed in a variety of ways, as will be understood by one skilled in the art considering the present disclosure. For example, the rotatable body may be positioned and configured to rotate about the major longitudinal axis of the elongated body as described above with reference to FIGS. 3-6.

At operation 940, a circuit of the elongated body may be coupled to the at least one electrical connector. An electrical connection between the circuit of the elongated body and the at least one electrical connector may be maintained when the rotatable body is rotated. Operation 940 may be performed in a variety of ways. For example, a circuit of the elongated body may be coupled to the at least one electrical connector while maintaining an electrical connection between the circuit of the elongated body and the at least one electrical connector when the rotatable body is rotated as described above with reference to FIG. 8.

As explained above, the devices, systems, and methods described herein may facilitate the convenient and secure mounting of a multimedia device (e.g., an interactive multimedia device) on an electronic device (e.g., a television, a display, etc.), a mounting structure, and/or a horizontal surface. For example, the multimedia device may include first and second bodies (e.g., an elongated body, an enclosure, a housing, etc.). The first body may be mounted on the electronic device and/or a horizontal surface. The second body may be disposed within the first body and may include one or more connectors for communication and/or power cables. The second body may be rotatable about a longitudinal axis of the first body while maintaining an electrical connection between a circuit within the first body and the connector(s).

By configuring the second body to rotate relative to the first body, the orientation of the cables may accommodate mounting options for securing the multimedia device to the electronic device, to a support structure, or on the horizontal surface. The devices, systems, and methods described herein may increase the usability of the multimedia device and/or improve the user experience. In some examples, configuring the rotatable body to allow connected cables to rotate to multiple positions may make it easier for users to conveniently mount the multimedia device on wall-mounted electronic devices (e.g., flat screen televisions, monitors, etc.) without being restricted by the bending radius of the connected cables.

In some embodiments, one or more objects (e.g., data associated with sensors, and/or activity information) of a computing system may be associated with one or more privacy settings. These objects may be stored on or otherwise associated with any suitable computing system or application, such as, for example, a social-networking system, a client system, a third-party system, a messaging application, a photo-sharing application, a biometric data acquisition application, an artificial-reality application, and/or any other suitable computing system or application.

Privacy settings (or "access settings") for an object may be stored in any suitable manner; such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within an application (such as an artificial-reality application). When privacy settings for an object allow a particular user or other entity to access that object, the object may be described as being "visible" with respect to that user or other entity. As an example, a user of an artificial-reality application may specify privacy settings for a user-profile page that identify a set of users that may access the artificial-reality application information on the user-profile page, thus excluding other users from accessing that information. As another example, an artificial-reality application may store privacy policies/guidelines. The privacy policies/guidelines may specify what information of users may be accessible by which entities and/or by which processes (e.g., internal research, advertising algorithms, machine-learning algorithms), thus ensuring only certain information of the user may be accessed by certain entities or processes.

In some embodiments, privacy settings for an object may specify a "blocked list" of users or other entities that should not be allowed to access certain information associated with the object. In some cases, the blocked list may include third-party entities. The blocked list may specify one or more users or entities for which an object is not visible.

Privacy settings associated with an object may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different objects of the same type associated with a user may have different privacy settings. In addition, one or more default privacy settings may be set for each object of a particular object-type.

By way of non-limiting examples, the following embodiments are included in the present disclosure.

Example 1: A multimedia device comprising an elongated first body comprising a major longitudinal axis between a proximal end and a distal end, a second body comprising at least one electrical connector accessible from a surface of the second body, wherein the second body is configured to rotate about the major longitudinal axis of the elongated first body, and an electrical coupling configured to maintain an electrical connection between a circuit of the elongated first body and the at least one electrical connector when the second body is rotated.

Example 2: The multimedia device of Example 1, wherein the elongated first body further comprises a supporting bracket connected pivotally to a rear surface of the elongated first body.

Example 3: The multimedia device of Example 2, wherein the supporting bracket pivots about the major longitudinal axis of the elongated first body.

Example 4: The multimedia device of Example 2 or Example 3, wherein the supporting bracket is configured to secure the elongated first body at an angle relative to a horizontal surface when the multimedia device is disposed on the horizontal surface.

Example 5: The multimedia device of Example 4, wherein the second body is configured to rotate about the major longitudinal axis of the elongated first body such that a cable connected to the at least one electrical connector is substantially parallel to the horizontal surface.

Example 6: The multimedia device of any of Examples 2 through 5, wherein the bracket is configured to secure the multimedia device to a top edge of an electronic device.

Example 7: The multimedia device of Example 6, wherein a gravitational force acting upon a cable connected to the at least one electrical connector increases a frictional force between the supporting bracket and the electronic device.

Example 8: The multimedia device of any of Examples 1 through 7, wherein the second body is configured to rotate about the major longitudinal axis of the elongated first body due to a gravitational force acting upon a cable connected to the at least one electrical connector.

Example 9: The multimedia device of any of Examples 1 through 8, wherein the second body is configured to rotate about the major longitudinal axis of the elongated first body by up to at least ninety degrees.

Example 10: The multimedia device of any of Examples 1 through 9, wherein the at least one electrical connector comprises at least one of a universal serial bus connector, a power cable, or a high-definition multimedia interface cable.

Example 11: An interactive multimedia device comprising a first housing comprising a major longitudinal axis between a proximal end and a distal end, a second housing comprising at least one electrical connector accessible from a surface of the second housing, wherein the second housing is configured to rotate about the major longitudinal axis of the first housing, and a supporting bracket coupled to the first housing, wherein the supporting bracket is configured to secure the interactive multimedia device to a top edge of an electronic device, and a gravitational force acting upon a cable connected to the at least one electrical connector increases a frictional force between the supporting bracket and the electronic device.

Example 12: The interactive multimedia device of Example 11, further comprising an electrical coupling that is configured to maintain an electrical connection between a circuit of the first housing and the at least one electrical connector when the second housing is rotated.

Example 13: The interactive multimedia device of Example 11 or Example 12, wherein the supporting bracket is pivotally connected to a rear surface of the first housing.

Example 14: The interactive multimedia device of any of Examples 11 through 13, wherein the supporting bracket pivots about the major longitudinal axis of the first housing.

Example 15: The interactive multimedia device of any of Examples 11 through 14, wherein the supporting bracket comprises a first supporting bracket and the interactive multimedia device further comprises a second supporting bracket connected to at least one of a front surface or a bottom surface of the first housing.

Example 16: The interactive multimedia device of any of Examples 11 through 15, wherein the supporting bracket is connected to the first housing at longitudinal end regions of the first housing.

Example 17: The interactive multimedia device of any of Examples 11 through 16, wherein the second housing is substantially cylindrical in shape.

Example 18: The interactive multimedia device of any of Examples 11 through 17, wherein the second housing is configured to rotate about the major longitudinal axis of the first housing due to the gravitational force acting upon the cable being connected to the at least one electrical connector.

Example 19: The interactive multimedia device of any of Examples 11 through 18, wherein the electronic device comprises at least one of a computer display, a television, a flat screen television, an audio speaker, a tablet, or a laptop computer.

Example 20: A method of manufacturing comprising positioning a rotatable body along a major longitudinal axis of an elongated body, wherein the major longitudinal axis is located between a proximal end and a distal end of the elongated body, disposing at least one electrical connector on a surface of the rotatable body, configuring the rotatable body to rotate about the major longitudinal axis of the elongated body, and coupling a circuit of the elongated body to the at least one electrical connector, wherein an electrical connection between the circuit of the elongated body and the at least one electrical connector is maintained when the rotatable body is rotated.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A multimedia device comprising:
an elongated first body comprising a major longitudinal axis between a proximal end and a distal end, wherein the elongated first body further comprises a supporting bracket connected pivotally to a rear surface of the elongated first body, and wherein the supporting bracket is configured to secure the multimedia device to a top edge of an electronic device;
a second body comprising at least one electrical connector accessible from a surface of the second body, wherein the second body is configured to rotate about the major longitudinal axis of the elongated first body; and
an electrical coupling configured to maintain an electrical connection between a circuit of the elongated first body and the at least one electrical connector when the second body is rotated.

2. The multimedia device of claim 1, wherein the supporting bracket pivots about the major longitudinal axis of the elongated first body.

3. The multimedia device of claim 1, wherein the supporting bracket is configured to secure the elongated first body at an angle relative to a horizontal surface when the multimedia device is disposed on the horizontal surface.

4. The multimedia device of claim 3, wherein the second body is configured to rotate about the major longitudinal axis of the elongated first body such that a cable connected to the at least one electrical connector is substantially parallel to the horizontal surface.

5. The multimedia device of claim 1, wherein a gravitational force acting upon a cable connected to the at least one electrical connector increases a frictional force between the supporting bracket and the electronic device.

6. The multimedia device of claim 1, wherein the second body is configured to rotate about the major longitudinal axis of the elongated first body due to a gravitational force acting upon a cable connected to the at least one electrical connector.

7. The multimedia device of claim 1, wherein the second body is configured to rotate about the major longitudinal axis of the elongated first body by up to at least ninety degrees.

8. The multimedia device of claim 1, wherein the at least one electrical connector comprises at least one of:
a universal serial bus connector;
a power cable; or
a high-definition multimedia interface cable.

9. An interactive multimedia device comprising:
a first housing comprising a major longitudinal axis between a proximal end and a distal end;
a second housing comprising at least one electrical connector accessible from a surface of the second housing, wherein the second housing is configured to rotate about the major longitudinal axis of the first housing; and a supporting bracket coupled to the first housing, wherein:
the supporting bracket is configured to secure the interactive multimedia device to a top edge of an electronic device; and
a gravitational force acting upon a cable connected to the at least one electrical connector increases a frictional force between the supporting bracket and the electronic device.

10. The interactive multimedia device of claim 9, further comprising an electrical coupling that is configured to maintain an electrical connection between a circuit of the first housing and the at least one electrical connector when the second housing is rotated.

11. The interactive multimedia device of claim 9, wherein the supporting bracket is pivotally connected to a rear surface of the first housing.

12. The interactive multimedia device of claim 9, wherein the supporting bracket pivots about the major longitudinal axis of the first housing.

13. The interactive multimedia device of claim 9, wherein:
the supporting bracket comprises a first supporting bracket; and
the interactive multimedia device further comprises a second supporting bracket connected to at least one of a front surface or a bottom surface of the first housing.

14. The interactive multimedia device of claim 9, wherein the supporting bracket is connected to the first housing at longitudinal end regions of the first housing.

15. The interactive multimedia device of claim 9, wherein the second housing is substantially cylindrical in shape.

16. The interactive multimedia device of claim 9, wherein the second housing is configured to rotate about the major longitudinal axis of the first housing due to the gravitational force acting upon the cable being connected to the at least one electrical connector.

17. The interactive multimedia device of claim 9, wherein the electronic device comprises at least one of:
a computer display;
a television;
a flat screen television;
an audio speaker;
a tablet; or
a laptop computer.

18. A method of manufacturing comprising:
positioning a rotatable body along a major longitudinal axis of an elongated body, wherein the major longitudinal axis is located between a proximal end and a distal end of the elongated body;
connecting a supporting bracket pivotally to a rear surface of the elongated body, wherein the supporting bracket is configured to secure the elongated body to a top edge of an electronic device;
disposing at least one electrical connector on a surface of the rotatable body;
configuring the rotatable body to rotate about the major longitudinal axis of the elongated body; and
coupling a circuit of the elongated body to the at least one electrical connector, wherein an electrical connection between the circuit of the elongated body and the at least one electrical connector is maintained when the rotatable body is rotated.

* * * * *